US009325427B1

(12) United States Patent
Oveis Gharan et al.

(10) Patent No.: US 9,325,427 B1
(45) Date of Patent: Apr. 26, 2016

(54) MAXIMUM LIKELIHOOD DECODING

(71) Applicants: Shahab Oveis Gharan, Nepean (CA);
Kim B. Roberts, Ottawa (CA);
Mahmoud Taherzadehboroujeni,
Ottawa (CA)

(72) Inventors: Shahab Oveis Gharan, Nepean (CA);
Kim B. Roberts, Ottawa (CA);
Mahmoud Taherzadehboroujeni,
Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 115 days.

(21) Appl. No.: 13/664,576

(22) Filed: Oct. 31, 2012

(51) Int. Cl.
*H04B 10/69* (2013.01)
*H04B 10/61* (2013.01)

(52) U.S. Cl.
CPC ............ *H04B 10/695* (2013.01); *H04B 10/612* (2013.01); *H04B 10/613* (2013.01); *H04B 10/697* (2013.01)

(58) Field of Classification Search
CPC .. H04B 10/695; H04B 10/613; H04B 10/612; H04B 10/697
USPC ............ 398/202; 375/262, 341; 714/786, 794
See application file for complete search history.

(56) References Cited

U.S. PATENT DOCUMENTS

| 5,150,381 | A  | * | 9/1992  | Forney et al. ................. 375/261 |
| 6,654,846 | B1 | * | 11/2003 | Franca-Neto ................. 710/305 |
| 7,672,408 | B2 | * | 3/2010  | Higuchi et al. ............... 375/347 |
| 2008/0137765 | A1 | * | 6/2008  | Dalla Torre et al. .......... 375/261 |
| 2008/0232510 | A1 | * | 9/2008  | Golitschek Edler Von Elbwart et al. ............................. 375/298 |
| 2011/0103795 | A1 | * | 5/2011  | Khandani et al. .............. 398/65 |
| 2011/0317781 | A1 | * | 12/2011 | Golitschek Edler Von Elbwart et al. ............................. 375/279 |
| 2012/0140612 | A1 | * | 6/2012  | Petrov et al. .................. 370/207 |
| 2013/0028355 | A1 | * | 1/2013  | Khayrallah .................... 375/340 |
| 2013/0028362 | A1 | * | 1/2013  | Rofougaran et al. .......... 375/350 |
| 2013/0089342 | A1 | * | 4/2013  | Oveis Gharan et al. ...... 398/208 |

OTHER PUBLICATIONS

Foggi, et al., "Maximum Likelihood Sequence Detection with Closed-Form Metrics in OOK Optical Systems Impaired by GVD and PMD", Journal of Lightwave Technology, vol. 24. Issue 8. pp. 3073-3087, (2006).
Ip, et al., "Coherent Detection in Optical Fiber Systems". Stanford University, Stanford, USA, pp. 1-38, 2007.

(Continued)

*Primary Examiner* — Leslie Pascal
(74) *Attorney, Agent, or Firm* — Kent Daniels; Daniels IP Services Ltd

(57) ABSTRACT

In a coherent receiver of an optical communication system, a method of processing a detected symbol estimate to determine a most likely value of a corresponding transmitted data word, the transmitted data word comprising one or more data bits encoded in a transmitter using a predetermined constellation of at least two symbols. A set of two or more virtual constellation points are define in a decision region corresponding to a possible value of the data word. The detected symbol estimate is processed to find a most likely virtual constellation point given the detected symbol estimate. The most likely value of the corresponding transmitted data word is determined based on the most likely virtual constellation point.

20 Claims, 6 Drawing Sheets

(56) References Cited

OTHER PUBLICATIONS

Kikuchi, "Highly Sensitive Optical Multilevel Transmission of Arbitrary Quadrature-Amplitude Modulation (QAM) Signals With Direct Detection", Journal of Lightwave Technology, vol. 28, No. 1, Jan. 1, 2010, pp. 123-130.

Zhao, et al., "MAP detection for impairment compensation in coherent WDM systems", published Jul. 20, 2009, Photonic Systems Group, Tyndall National Institute and Department of Physics, University College Cork, Aug. 3, 2009, vol. 17, No. 16 / Optics Express 13401, Cork, Ireland, pp. 1-7.

* cited by examiner

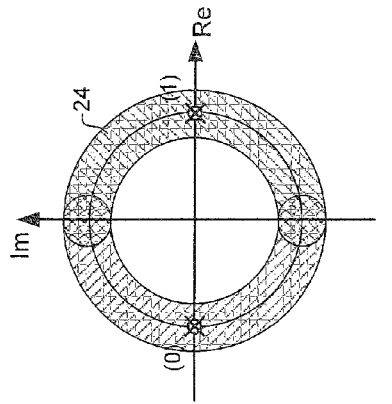
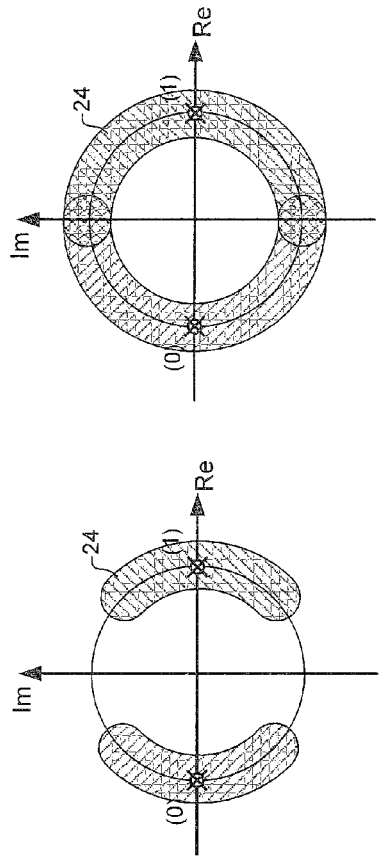
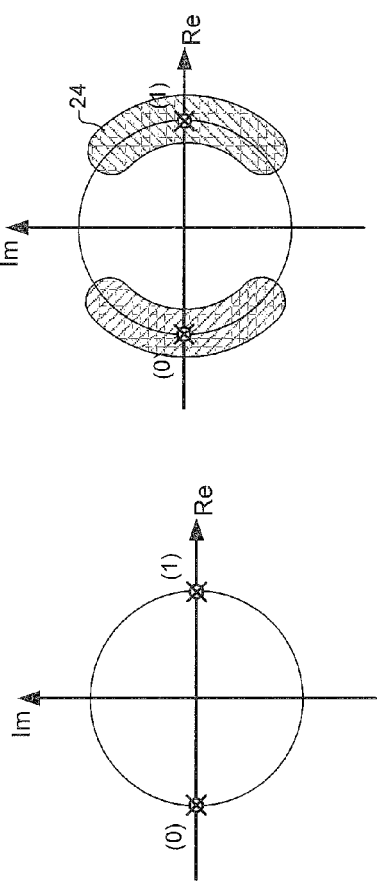
Figure 2C (Prior Art)
Figure 2B (Prior Art)
Figure 2A (Prior Art)
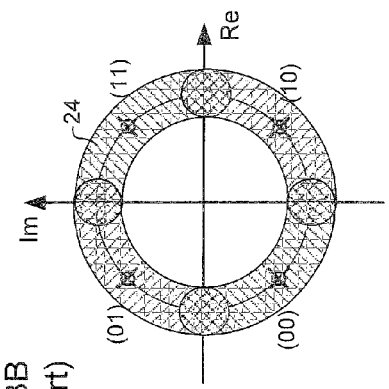
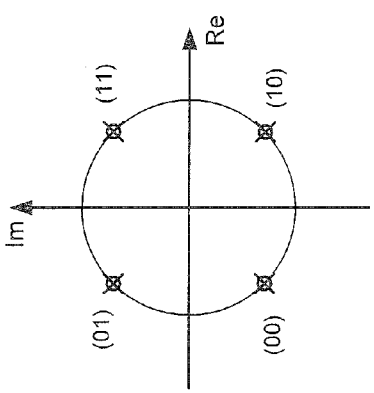
Figure 3B (Prior Art)
Figure 3A (Prior Art)

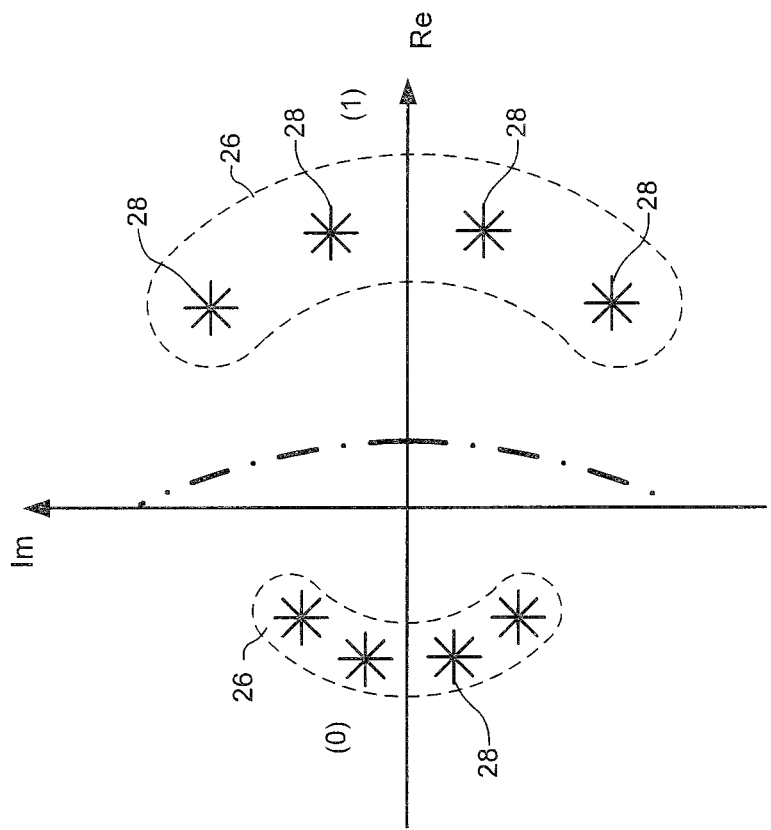

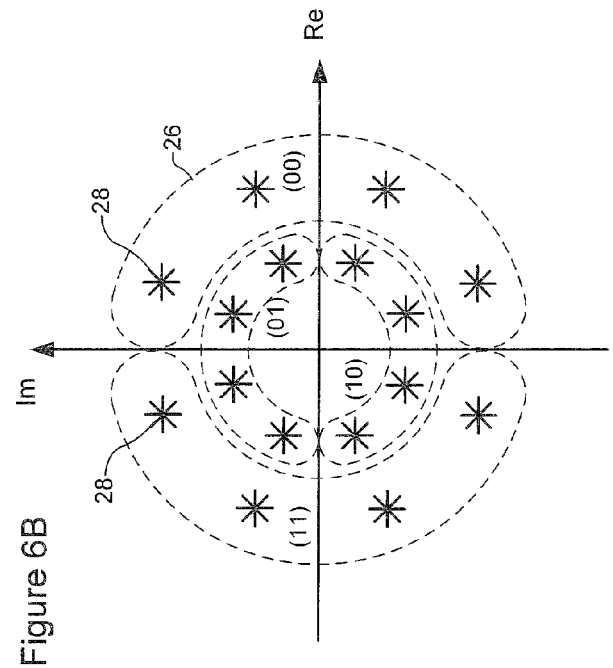
Figure 6B
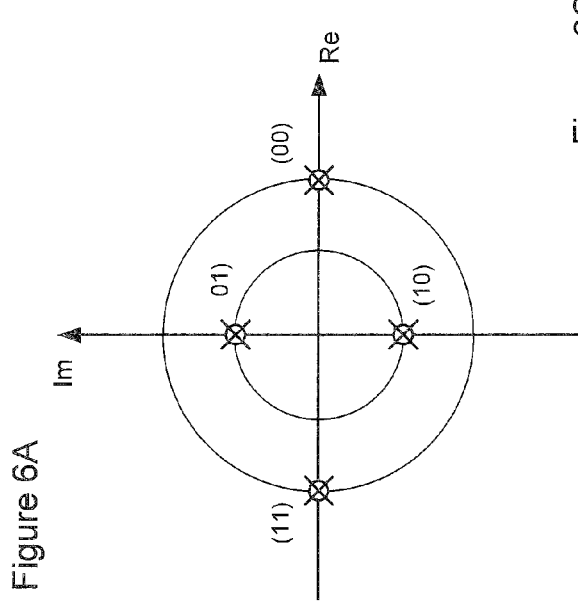
Figure 6A
Figure 6C

MAXIMUM LIKELIHOOD DECODING

CROSS-REFERENCE TO RELATED APPLICATIONS

This is the first application filed in respect of the present invention.

FIELD OF THE INVENTION

The present application relates generally to management of communications systems, and more specifically to techniques for Maximum Likelihood (ML) decoding.

BACKGROUND

FIG. 1 illustrates a typical optical communications system using coherent detection. In an optical communications system, a transmitter 2 generally comprises an encoder 4 for encoding a pair of data signals in accordance with a predetermined encoding scheme, and a modulator 6 for modulating a continuous wave (CW) carrier light in accordance with the encoded data signals. In the arrangement if FIG. 1, a pair of data signals (dx and dy) may be modulated onto respective orthogonal polarizations of the carrier light. The CW carrier light is typically generated by a laser 8 in a manner known in the art, and the modulator may be implemented using any of a variety of known modulator devices, such as phase modulators, variable optical attenuators Mach-Zehnder interferometers etc. The modulated optical signal appearing at thee output of the modulator 6 is transmitted through an optical fiber link 10 to a coherent receiver 12.

A typical coherent receiver 12 typically includes a polarization beam splitter 14 for splitting the received optical signal into received X and Y polarizations, an optical hybrid 16 for mixing the X and Y polarizations with a local oscillator light, and a set of photodetectors 18 for detecting the optical power of each of the mixing products generated by the optical hybrid 16. An A/D converter block 20 samples each photodetector current, and the resulting sample streams are processed by a Digital Signal Processor (DSP) 22 to generate recovered signals Rx and Ry that correspond with the transmitted data signals dx and dy.

For achieving long distance optical signal transmission, at moderate spectral efficiencies, dual polarization Binary Phase Shift Keying (DP-BPSK) is commonly used to encode the data signals and modulate the carrier light in the transmitter. As is known in the art, BPSK encodes a single bit value ("0" or "1") onto an optical carrier by modulating the carrier phase between two constellation points, that are separated by 180°. This is illustrated in FIG. 2A, which shows the BP SK constellation mapped onto the Real (Re)-Imaginary (Im) plane of a carrier light.

As is known in the art, other modulation schemes enable increased numbers of bits to be encoded into a symbol. For example, Quadrature Phase Shift Keying (QPSK) enables two bits to be encoded on each polarization of carrier light, by using a symmetrical 4-point constellation as may be seen in FIG. 3A. Other modulation schemes, such as Quadrature Amplitude Modulation (QAM) achieve even higher numbers of bits per symbol by modulating both the phase and amplitude of the carrier. However, as the number of encoded bits-per-symbol increases, the Euclidian distance between neighbouring constellation points decreases. For example, in the BPSK constellations shown in FIG. 2A, each constellation point is separated from its neighbour by a Euclidean distance corresponding to 180°. On the other hand, in the QPSK constellations shown in FIG. 3A, each constellation point is separated from its neighbour by a Euclidean distance corresponding to 90°.

In practice, Phase Shift Keying encoding and coherent detection typically suffers greater penalties due to phase distortion than due to amplitude distortion. This is illustrated in FIG. 2B for the case of BPSK. As may be seen in FIG. 2B, each transmitted symbol (X(0), X(1)) may be detected by the receiver as a multi-bit symbol estimate lying anywhere within a detection region 24. As long as the respective detection regions of each symbol are distinct, as in FIG. 2B, known Maximum Likelihood (ML) techniques based on minimum Euclidean Distance (ED) can accurately determine the transmitted symbol given the detected symbol estimate. However, if the phase noise becomes too large, the detection regions can overlap, as may be seen in FIG. 3C. In this case, if the detected symbol estimate lies in the overlapping portion of two detection regions, Maximum Likelihood (ML) techniques based on minimum Euclidean Distance (ED) cannot accurately determine the transmitted symbol. This increases the probability of error in the recovered symbols, and thus the recovered data streams Rx and Ry. As may be seen in FIG. 3B, while QPSK modulation increases the number of encoded bits per transmitted symbol relative to BPSK, it is less tolerant of phase noise at the receiver.

Techniques that increase noise tolerance remain highly desirable.

SUMMARY

An aspect of the present invention provides, in a coherent receiver of an optical communication system, a method of processing a detected symbol estimate to determine a most likely value of a corresponding transmitted data word, the transmitted data word comprising one or more data bits encoded in a transmitter using a predetermined constellation of at least two symbols. A set of two or more virtual constellation points are defined in a decision region corresponding to a possible value of the data word. The detected symbol estimate is processed to find a most likely virtual constellation point given the detected symbol estimate. The most likely value of the corresponding transmitted data word is determined based on the most likely virtual constellation point.

BRIEF DESCRIPTION OF THE DRAWINGS

Further features and advantages of the present invention will become apparent from the following detailed description, taken in combination with the appended drawings, in which:

FIGS. 2A-2C illustrate transmission and detection of symbols in a BPSK modulation scheme;

FIGS. 3A-3B illustrate transmission and detection of symbols in a QPSK modulation scheme;

FIGS. 5A and 5B illustrate an ML decoding scheme using the asymmetrical BPSK modulation of FIG. 4;

FIGS. 6A-6C illustrate an ML decoding scheme using an asymmetrical QPSK constellation.

DETAILED DESCRIPTION

The present application provides techniques for data detection that are tolerant to optical distortion due, for example, to phase noise and cross polarization modulation (XPolM. In accordance with the present techniques, an asymmetrical constellation can be used to encode and transmit data through a communications system. At a receiver, each symbol of the asymmetrical constellation is represented by a respective set of 2 or more virtual constellation points. A Maximum likelihood decoding method such as minimum Euclidean distance decoding can then be used to find the most likely virtual constellation point, given the detected symbol estimate. The determined virtual constellation point can then be used to select the most likely value of the transmitted symbol. Furthermore, the relative likelihood metric of different virtual constellation points may be used to estimate the Likelihood of different actual symbols and different transmitted bits in presence of optical fiber distortions.

Figure 1:
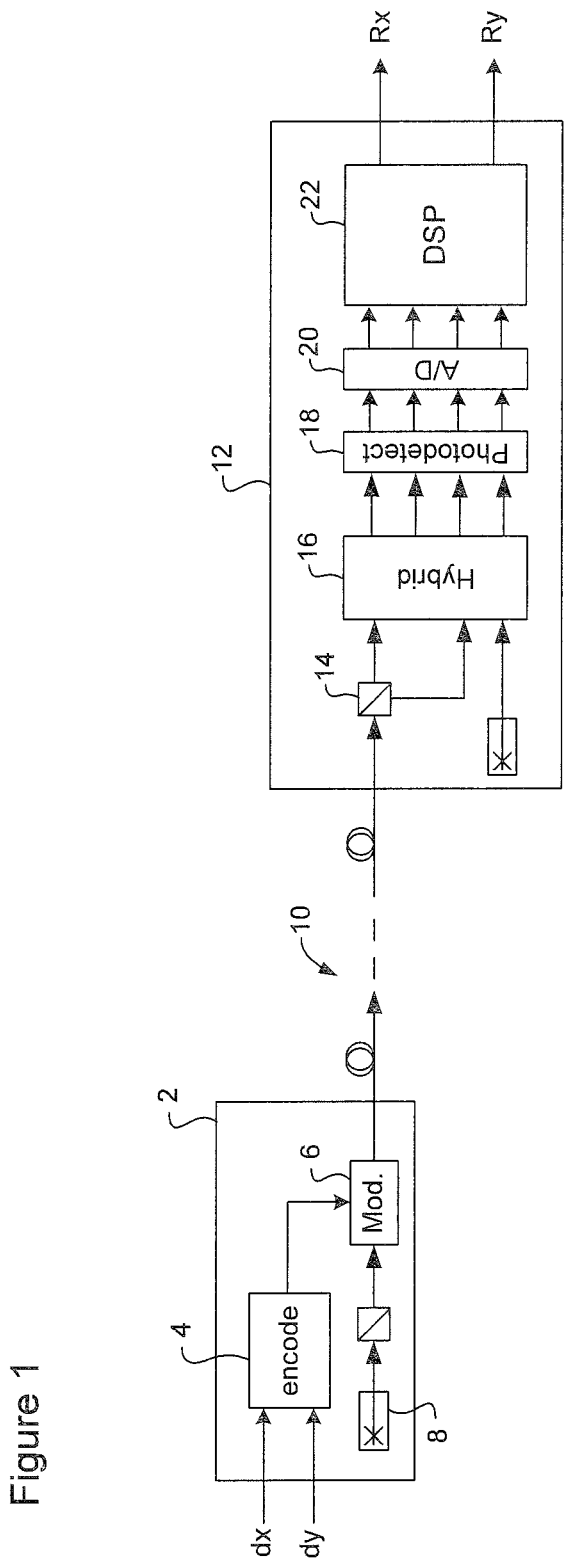
FIG. 1 is a block diagram schematically illustrating elements of an optical communications system using coherent detection.
Figure 4B:
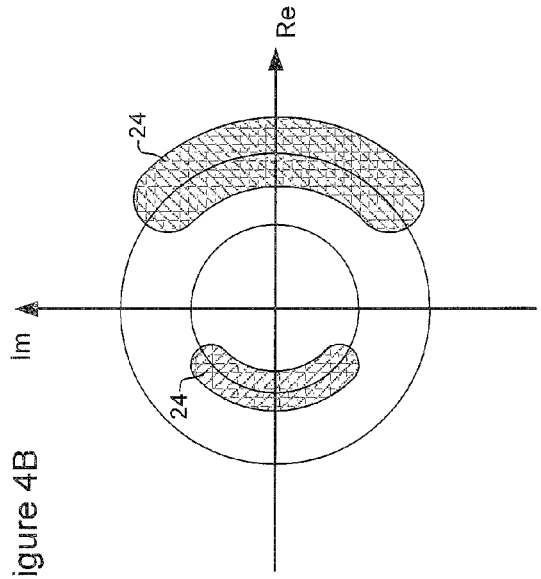
FIGS. 4A-4C illustrate an asymmetrical BPSK modulation scheme.
Figure 4C:
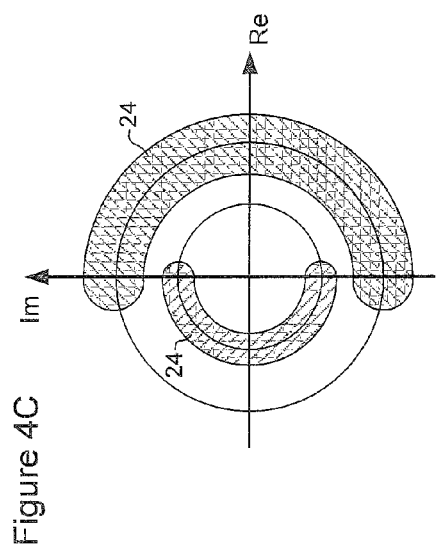
Figure 4A:
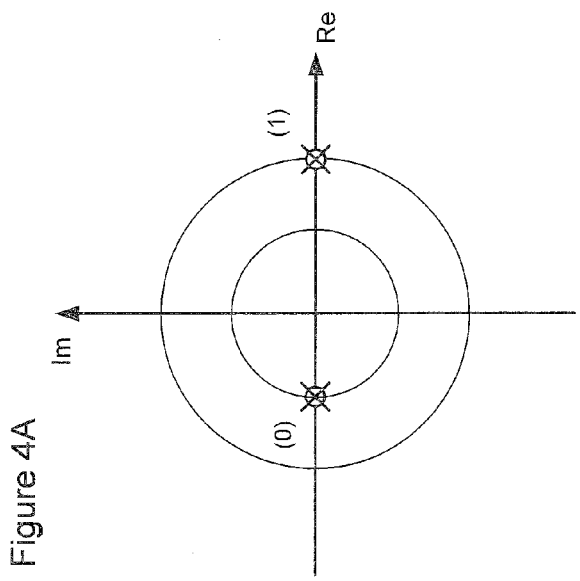

FIGS. 4A-C illustrate an example embodiment utilizing an asymmetrical BPSK encoding scheme. As may be seen in FIG. 4A, the asymmetrical BPSK encoding utilizes a symbol constellation of two symbols separated by a phase angle of 180°, similarly to conventional BPSK. However, in addition to the phase difference, each of the constellation points also have respective different amplitudes. This means that the CW carrier light(s) are modulated in both amplitude and phase at the transmitter.

As may be seen in FIG. 4B, at the receiver, detected multibit symbol estimates will lie within detection regions 24 that reflect the asymmetry of the transmitted constellation. An advantage of the asymmetrical symbol constellation is that it can be used to reduce overlap between adjacent detection regions. As may be seen in FIG. 4C, suitable selection of the respective amplitudes of each of the two BPSK symbols can be used to prevent overlapping detection regions, even for very high phase error.

Referring now to FIG. 5, this feature may be exploited by modelling each detection region 24, in the receiver, as a decision region 26 including a set of two or more virtual constellation points 28. In the example of FIG. 5A, each decision region 26 is modelled as a respective set of four virtual constellation points 28, although more or fewer virtual constellation points may be used, as desired. In some embodiments, the set of virtual constellation points 28 are evenly distributed within their respective decision region. In some embodiments, the virtual constellation points within a given set are rotated version of their associated constellation symbol, and are distributed across a range of phase angles corresponding to an expected maximum phase error of symbol estimates detected by the receiver. Thus, for example, in FIG. 5A, the virtual constellation points are rotated versions of their corresponding constellation symbols, and span a range of ±45° relative to their corresponding constellation symbols.

Preferably, each virtual constellation point has a value that is selected to facilitate mapping to its corresponding constellation symbol. For example, FIG. 5B shows a table of constellation symbol values (S) and the virtual symbol values (VS) of the associated virtual constellation points. In the example of FIG. 5B the BPSK constellation symbol value "0" is associated with a respective set of four virtual constellation points having values of "000". "001", "010" and "011". Similarly, the BPSK constellation symbol value "1" is associated with a respective set of four virtual constellation points having values of "100". "101", "110" and "111". As may be seen, in this example, the most significant bit (MSB) of each virtual constellation point corresponds with the associated BPSK constellation symbol value. With this arrangement, conventional Maximum Likelihood (ML) techniques based on minimum Euclidean Distance (ED) (or other known Likelihood metrics) can accurately find the most likely virtual constellation point given the detected symbol estimate. The most likely transmitted symbol can then be obtained by taking the most significant bit of the most likely virtual constellation point.

In these embodiments, the soft likelihood values of different symbol estimates can also be improved by comparing the likelihood of different virtual constellation points corresponding to different detected symbol estimates. As an example, in embodiment of FIGS. 5A-5B, we can estimate the likelihood of a given BPSK symbol by subtracting the best (minimum) ED value for the set of virtual points (000, 001, 010, 011) from the best (minimum) ED value for the set of virtual points (100, 101, 110, 111).

The methods described above can also be applied to richer modulation schemes. An example is QPSK modulation which has a 90 degree separation between neighbouring constellation points and therefore is much more susceptible to phase noise, as compared with BPSK modulation. FIG. 6A shows an embodiment utilizing an "asymmetric QPSK" constellation which has the same data throughput as conventional QPSK encoding, but is much more robust against the phase noise, because the constellation points have 180 degree angular distance with respect to each other. However, with conventional minimum ED decoding methods it is not possible to exploit the increased angular separation. As an example, a detected symbol estimate having a pure +60 degree phase rotation relative to the transmitted symbol 00 would be mapped to the constellation symbol 01 by a conventional minimum ED decoder. FIG. 6B shows the placement of virtual constellation points corresponding to each constellation symbol. FIGS. 6B and 6C illustrate each decision region of asymmetrical constellation of FIG. 6A. As may be seen in FIG. 6B, each decision region is modelled as a respective set of four virtual constellation points evenly distributed within their respective decision region. FIG. 6C shows a table of constellation symbol values (S) and the virtual symbol values (VS) of the associated virtual constellation points. In the example of FIG. 6C the QPSK constellation symbol value "00" is associated with a respective set of four virtual constellation points having values of "0000". "0001", "0010" and "0011". Similarly, the QPSK constellation symbol value "01" is associated with a respective set of four virtual constellation points having values of "0100". "0101", "0110" and "0111". The QPSK constellation symbol value "10" is associated with a respective set of four virtual constellation points having values of "1000". "1001", "1010" and "1011", and the QPSK constellation symbol value "11" is associated with a respective set of four virtual constellation points having values of "1100". "1101", "1110" and "1111". As may be seen, in this example, the two most significant bits (MSB) of each virtual constellation point corresponds with the associated QPSK constellation symbol value. With this arrangement, a receiver may implement conventional Maximum Likelihood (ML) techniques based on minimum Euclidean Distance (ED) (or other known Likelihood metrics) to accurately find the most likely virtual constellation point given a detected symbol estimate with a phase error of up to ±90°.

In some embodiments, virtual constellation points can be applied to symbol constellations defined across different polarizations or different time-slots. In general terms, an N-symbol constellation is defined in an M-dimensional space, and a composite distance between a given pair of symbols within the constellation increases with increasing Hamming distance between data words encoded in each of those symbols. During run-time, a data signal to be transmitted is encoded as symbols of the constellation, and modulated onto at least M dimensions of a carrier light in accordance with the symbols. The M dimensions of the carrier light may comprise different polarizations and/or different time-slots.

Figure 7A:
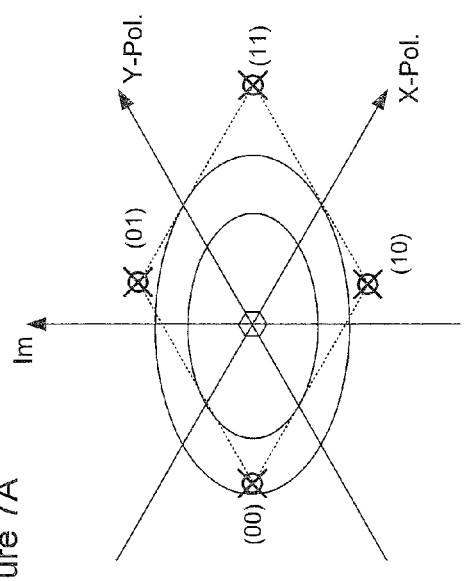
FIGS. 7A-7C illustrate an ML decoding scheme using an asymmetrical constellation distributed across orthogonal polarizations.
Figure 7C:
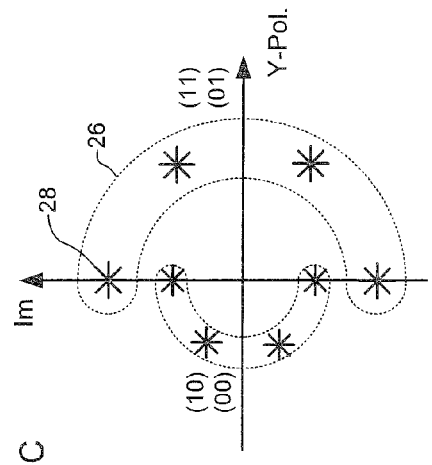
Figure 7B:
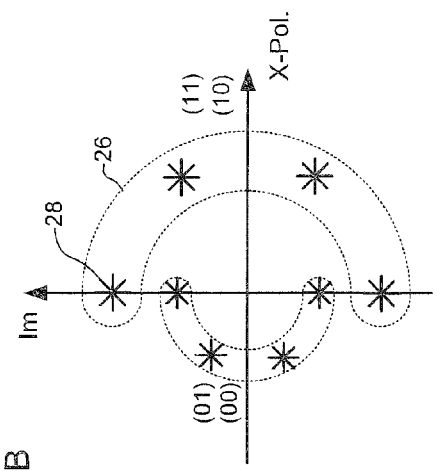

A convenient visualization of the M-dimensional constellation is to consider a set of orthogonal 2-dimensional frames, each of which contains a respective 2-D projection of the constellation. In this case, the respective images (projections) of any two frames are related to each other by a rotation of the constellation about at least one axis of the M-dimensional space. Each frame may be associated with the Re-Im (or, equivalently, the In-phase-Quadrature) plane of a linearly polarized optical carrier light, and so used in a transmitter to transmit data symbols by suitable modulation of the amplitude and phase of the carrier light. Similarly, the frame associated with a given transmitted polarization can be used in a coherent receiver to detect and decode data symbols of the constellation. By suitable selection of the rotation axes, any two constellation points that have a small Euclidian separation in one frame will have a large Euclidian separation in at least one other frame. Because the separation of any two constellation points is large in at least one frame, encoded N-bit data symbols can be unambiguously detected in a coherent receiver, by correlating sample streams of each transmitted polarization to the associated frame(s), even in cases where signal-to-noise ratio is very low. Further, since each frame contains every point of the constellation, data recovery is highly tolerant of polarization dependent impairments (e.g. PDL). FIGS. 7A-7C illustrate an embodiment in which an N=4 symbol constellation is defined in an M=3-dimensional space, distributed over the X- and Y-polarizations of a carrier light.

As may be seen in FIG. 7A, when projected onto respective orthogonal Re-Im planes (corresponding to the X- and Y-polarizations) all four symbols of the constellation lay on the Real axis, in a pattern closely similar to that of the asymmetrical BPSK constellation of FIGS. 4A-4C. An important difference in this case is that in each projection, each point represents a pair of overlapping symbols. However, as may be seen in FIGS. 7B and 7C, symbols that overlap in one projection are widely separated in the other. Accordingly, by processing symbol estimates obtained from both received polarizations, it is possible to unambiguously determine the transmitted symbol. This arrangement is particularly suited to cases in which phase noise impairments are highly correlated between the two polarizations.

The examples described above illustrated the application of virtual points for scenarios with high phase noise. However, the present invention is not limited to such embodiments. Indeed, the virtual points can also be designed to approximate true likelihood values and decision regions in presence of other impairments. Another example for application of virtual points is a channel with high cross polarization modulation (XPolM) impairment. In this case, the dual-polarization virtual points can be designed by adding a cross polarization term to the transmitted symbol in order to approximate different typical XPolM realizations of the channel.

Examples above described representative methods for generation of virtual points. In general, virtual points may be derived by any suitable method. As an example, the symbol space may be divided into non-overlapping sub-regions based on a given constellation symbol, and each sub-region modeled using one or more virtual point.

Alternatively, vector quantization methods or clustering methods may used to derive virtual points for each constellation symbol. For example, for a given constellation symbol, a large population of (possibly multi-dimensional) detected symbol estimates may be accumulated, and known clustering methods used to derive a set of virtual points that represent the population of detected symbol estimates. Different clustering methods with different criteria may be used, depending on the specific application. An example is the K-mean based algorithm which minimizes the sum of square of ED values of detected symbol estimates from virtual points, or algorithms based on other criteria such as K-median or K center. In some cases, the criteria may be modified for the specific application. As an example, the criteria may be modified to the sum of ED values of the detected symbol estimates inside a cluster to their nearest virtual point minus the sum of ED values of detected symbol estimates corresponding to other transmitted symbols. In general, the criteria of clustering can be modified so that the virtual points can better approximate the best decision region for the specific channel conditions.

The examples above illustrate the application of virtual points for channels with different type of distortions. Another example of the application of virtual points is to reduce the complexity of "soft" decoding for rich modulation formats having lots of constellation symbols. In general, for true "soft" decoding of a complex modulation format with more than 2 symbols, one may need to calculate the respective likelihood that a given detected symbol estimate corresponds with every possible symbol of the constellation, and then calculate the likelihood of each transmitted bit as a function of likelihood of all different symbols. This method suffers from increasing complexity as the number of constellation symbols increases. This problem may be mitigated by defining a set of virtual points (where the number of points in the set is much smaller than the number of symbols in the constellation) for a given set of one or more transmitted bits so that the set of virtual points approximate well the decision boundaries of the selected transmitted bit(s). Then, the likelihood of the selected family of transmitted bit(s) can be calculated based on the respective likelihood of each virtual point. In this application, the number of virtual points corresponding to a given transmitted bit value (such as "0") is much smaller than the number of actual transmitted symbols corresponding to a specific bit being equal to "0". In this application, virtual points approximate the performance of true ML decoding by the use of much smaller number of calculations.

Under low phase error conditions, this technique does not yield a significant improvement of data detection performance in a coherent receiver, However, as the phase noise increases, a significant improvement in performance relative to conventional ML detection techniques can be obtained.

In the above description, BPSK and QPSK symbols are referred to has having a given value. In practice, the "constellation symbol value" is the data word encoded into the symbol at the transmitter. In BPSK and QPSK encoding schemes, it is convenient to define a unique one-to-one mapping between each possible data word and a respective symbol of the constellation. In this case, it is also convenient to refer to processing of the detected symbol estimate to find the most likely transmitted symbol, as opposed to the most likely data word encoded in that transmitted symbol. However, this is not essential. More generally, the methods described above can be used to process the detected symbol estimate to find the most likely transmitted data word. A may be appreciated, a transmitted data word may be represented by more than one symbol of the constellation. For example, a single polarization 16-QAM constellation (having 16 symbols) could be used to encode and transmit data words having only four possible values (eg represented by the two sign bits of each constellation symbol). In this example, each possible data word value may be mapped to a set of four constellation symbols. At the receiver, the virtual points associated with this transmitted data word may correspond with some or all of the transmitted constellation points. Only the relevant bits are decoded from the chosen the most likely virtual symbol to recover the data word.

For example, the choice between the multiple constellation symbols to represent one transmitted data word could be made so as to reduce bandwidth, reduce interference, or encode additional information that might be decoded at some other location, line condition, or time.

The embodiments of the invention described above are intended to be illustrative only. The scope of the invention is therefore intended to be limited solely by the scope of the appended claims.

We claim:

1. In a receiver of an optical communication system, a method of processing a detected symbol estimate to determine a most likely value of a corresponding transmitted data word, the transmitted data word comprising one or more data bits encoded in a transmitter using a predetermined constellation of at least two symbols, the detected symbol estimate being an estimated value of a corresponding symbol modulated on a carrier light by the transmitter, the method comprising:

processing the detected symbol estimate to identify a most likely virtual constellation point from four or more predetermined virtual constellation points, the four or more predetermined virtual constellation points forming at least two sets, at least two of said sets having two or more of the predetermined virtual constellation points, and each set of the virtual constellation points lying within a respective decision region associated with each possible value of the transmitted data word; and processing the identified most likely virtual constellation point to determine the most likely value of the transmitted data word.

2. The method of claim 1, wherein each possible value of the data word is encoded by the transmitter as a respective unique symbol of the predetermined constellation of at least two symbols.

3. The method of claim 1, wherein each possible value of the data word is encoded by the transmitter as two or more symbols of the predetermined constellation of at least two symbols.

4. The method of claim 1, wherein the respective decision region associated with each possible value of the data word models expected errors in the detected symbol estimate due to channel and system distortions.

5. The method of claim 4, wherein the channel distortions include phase noise distortion.

6. The method of claim 5, wherein the respective decision region associated with each possible value of the data word spans an expected range of phase error of the detected symbol estimate.

7. The method of claim 6, wherein each virtual constellation point is a phase rotated version of a respective symbol of the predetermined constellation of at least two symbols.

8. The method of claim 4, wherein the channel distortion includes cross polarization modulation distortion.

9. The method of claim 4, wherein the system distortion includes cycle-slip distortion.

10. The method of claim 1, wherein the predetermined constellation of at least two symbols is asymmetric.

11. The method of claim 1, wherein processing the detected symbol estimate to identify a most likely virtual constellation point comprises identifying the virtual constellation point having the shortest Euclidian Distance to the detected symbol estimate.

12. The method of claim 1, wherein determining the most likely value of the corresponding transmitted data word based on the identified most likely virtual constellation point comprises mapping a value of each virtual constellation point to a value of a respective symbol of the predetermined constellation of at least two symbols.

13. The method of claim 12, wherein the value of the respective symbol of the predetermined constellation of two or more symbols corresponds with one or more Most Significant Bits (MSB) of each virtual constellation point.

14. The method of claim 1, wherein determining the most likely value of the corresponding transmitted data word based on the identified most likely virtual constellation point comprises mapping predetermined bits of each virtual constellation point to corresponding bits of each possible transmitted data word.

15. The method of claim 14, wherein the predetermined bits of each virtual constellation point comprise sign bits of the each constellation point.

16. A receiver of an optical communication system, the receiver comprising:

a processor configured to process a detected symbol estimate to determine a most likely value of a corresponding transmitted data word comprising one or more data bits encoded in a transmitter using a predetermined constellation of at least two symbols, the detected symbol estimate being an estimated value of a corresponding symbol modulated on a carrier light by the transmitter, the processor being operative to determine the most likely value of a corresponding transmitted data word by:

processing the detected symbol estimate to identify a most likely virtual constellation point from four or more predetermined virtual constellation points, the four or more predetermined virtual constellation points forming at least two sets, at least two of said sets having two or more of the predetermined virtual constellation points, and each set of virtual constellation points lying within a respective decision region associated with each possible value of the transmitted data word; and processing the identified most likely virtual constellation point to determine the most likely value of the transmitted data word.

17. The receiver of claim 16, wherein the respective decision region associated with each possible value of the data word models expected errors in the detected symbol estimate due to channel and system distortions.

18. The receiver of claim 17, wherein the channel distortions include phase noise distortion.

19. The receiver of claim 18, wherein the respective decision region associated with each possible value of the data word spans an expected range of phase error of the detected symbol estimate.

20. The receiver of claim 16, wherein the predetermined constellation of at least two symbols is asymmetric.

* * * * *